(12) United States Patent
Murata et al.

(10) Patent No.: US 9,731,442 B2
(45) Date of Patent: Aug. 15, 2017

(54) MOLD CLAMPING APPARATUS

(71) Applicant: NISSEI PLASTIC INDUSTRIAL CO., LTD., Nagano (JP)

(72) Inventors: Atsushi Murata, Nagano (JP); Daiki Tanemura, Nagano (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 0 days.

(21) Appl. No.: 15/244,151

(22) Filed: Aug. 23, 2016

(65) Prior Publication Data

US 2017/0057142 A1    Mar. 2, 2017

(30) Foreign Application Priority Data

Aug. 27, 2015    (JP) .................................. 2015-168013

(51) Int. Cl.
*B29C 45/17* (2006.01)
*B29C 45/67* (2006.01)
*B29K 105/00* (2006.01)

(52) U.S. Cl.
CPC .......... *B29C 45/67* (2013.01); *B29C 45/1751* (2013.01); *B29C 45/1747* (2013.01); *B29C 45/1761* (2013.01); *B29C 45/6721* (2013.01); *B29C 45/6728* (2013.01); *B29K 2105/0067* (2013.01)

(58) Field of Classification Search
CPC ............ B29C 45/1744; B29C 45/1747; B29C 45/1751; B29C 45/1761; B29C 45/67; B29C 45/6721; B29C 45/6728
See application file for complete search history.

(56) References Cited

U.S. PATENT DOCUMENTS

| | | | | |
|---|---|---|---|---|
| 6,027,329 A | * | 2/2000 | Nazarian | B29C 45/1744 264/219 |
| 6,655,949 B2 | * | 12/2003 | Chikazawa | B29C 45/6707 425/190 |
| 7,080,978 B2 | * | 7/2006 | Glaesener | B29C 45/1744 100/295 |

FOREIGN PATENT DOCUMENTS

| | | | |
|---|---|---|---|
| JP | 11-235741 | * | 8/1999 |
| JP | 2000-246774 | * | 9/2000 |

OTHER PUBLICATIONS

English-language translation of Japanese Publication No. JP 05-329900, Publication date Dec. 14, 1993.

* cited by examiner

*Primary Examiner* — James Mackey
(74) *Attorney, Agent, or Firm* — Adams & Wilks

(57) ABSTRACT

A mold clamping apparatus includes a mold clamping cylinder. The mold clamping cylinder has, in a region thereof located below left and right lower tie bars and above left and right sliders, a left grooved portion opened leftward and elongated horizontally, a right grooved portion opened rightward and elongated horizontally, and a leg portion formed between the left and right grooved portions. The leg portion and the left and right grooved portions together form a constricted part.

2 Claims, 12 Drawing Sheets

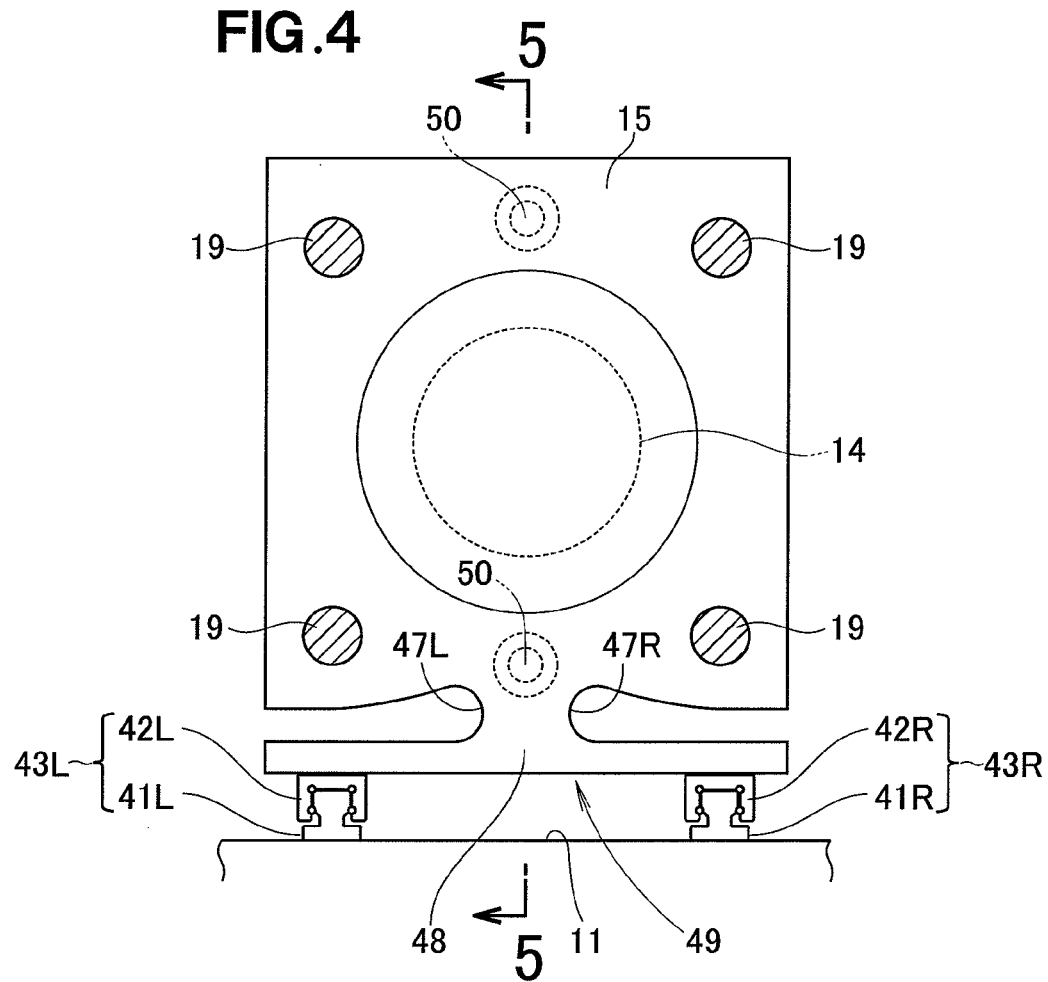

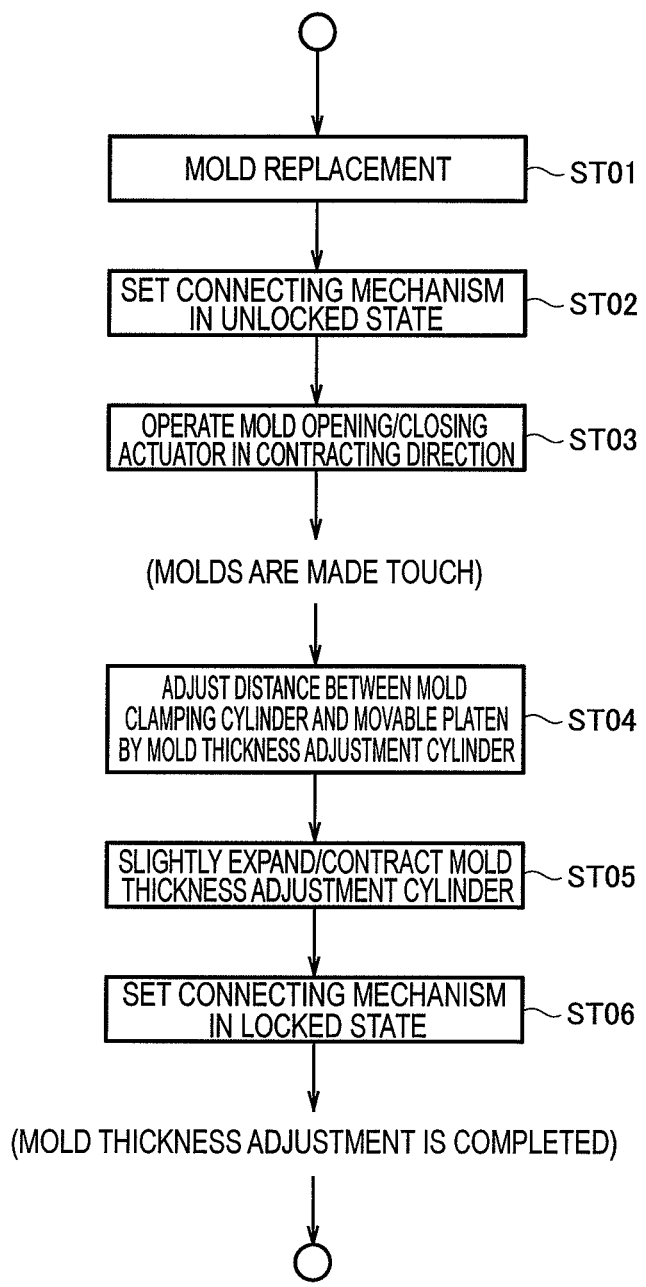

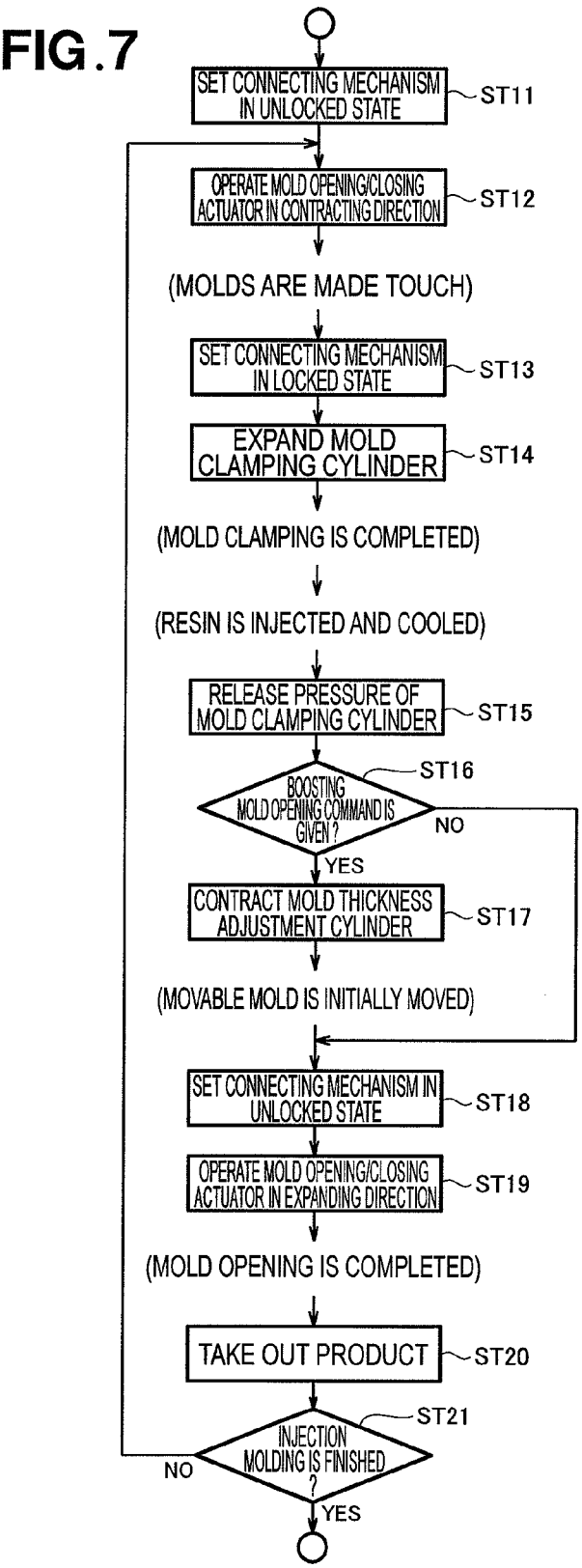

US 9,731,442 B2

MOLD CLAMPING APPARATUS

FIELD OF THE INVENTION

The present invention relates to an improvement in a mold clamping apparatus mounted on a horizontal injection molding machine.

BACKGROUND OF THE INVENTION

Horizontal injection molding machines mainly comprise a mold clamping apparatus for clamping a mold, and an injecting apparatus for injecting a resin material into the clamped mold. The mold clamping apparatus includes a fixed platen for supporting a fixed mold, a movable platen for supporting a movable mold, and a mold clamping cylinder for pressing the movable platen toward the fixed platen, as disclosed, for example, in Japanese Patent Application Laid-Open Publication No. (JP-A) H05-329900.

The prior art invention disclosed in JP H05-329900A will be described below with reference to FIG. 11 hereof. As shown in FIG. 11, a conventional mold clamping apparatus 100 includes a fixed platen 102 fixedly mounted on a base 101, a mold clamping cylinder 103 horizontally movably disposed on the base 101, tie bars 104, 104 extending horizontally between the mold clamping cylinder 103 and the fixed platen 102, a movable platen 106 guided by the tie bars 104, 104 and connected to a piston rod 105 of the mold clamping cylinder 103, and nuts 107, 107 threadedly mounted on the tie bars 104, 104, respectively, for restricting movement of the mold clamping cylinder 103.

Additionally, a rail 108 is laid on the base 101, and sliders 109, 110 as sliding members are slidably fitted with the rail 108. The slider 109 supports the mold clamping cylinder 103, and the slider 110 supports the movable platen 106.

A fixed mold 111 is attached to the fixed platen 102, and a movable mold 112 is attached to the movable platen 106. After the movable mold 112 is in abutment with the fixed mold 111, the mold clamping cylinder 103 is expanded. The movable platen 106 is thereby pressed toward the fixed platen 102, and thus mold clamping is performed.

At the time of mold clamping, a mold clamping reaction force equal to a mold clamping force is produced. By the mold clamping reaction force, the mold clamping cylinder 103 is bent as shown by an imaginary line A. Note that the imaginary line A is emphasized herein to facilitate understanding. Due to the bend of the mold clamping cylinder 103, the slider 110 is inclined at an angle α.

FIG. 12 is a cross-sectional view taken along line 12-12 of FIG. 11. As shown in FIG. 12, the slider 109 having an inverted U-shaped cross section is mounted on the rail 108 having a rectangular cross section. In this structure, floating of the slider 109 from the rail 108 is allowed. However, in this structure, the rail 108 and the slider 109 are in surface contact with each other. By this surface contact, a large frictional resistance is generated between the rail 108 and the slider 109.

In the mold clamping apparatus 100 shown in FIG. 11, when the mold is replaced, the nuts 107, 107 are loosened, the slider 109 is moved to change the position of the mold clamping cylinder 103, and the nuts 107, 107 are tightened.

When the frictional resistance between the rail 108 and the slider 109 is large, energy required for moving the slider 109 becomes large, and accordingly the operation cost is increased. It is therefore necessary to reduce the frictional resistance.

An example of measures for reducing the frictional resistance will be described below with reference to FIG. 13. As shown in FIG. 13, steel rolling elements 113 are built in between the rail 108 and the slider 109. The steel rolling elements 113 are steel balls or steel rollers. Since frictional resistance in rolling contact is approximately one-tenth of that in surface contact, when the steel rolling elements 113 are used, the frictional resistance can be greatly reduced. Thus, such a structure is preferred in recent years.

Hereinbelow, this mechanism consisting of the rail 108, the slider 109 and the rolling elements 113 will be referred to as "linear guide mechanism with built-in rolling elements".

When the slider 110 is inclined at the angle α as shown in FIG. 11, the rolling elements 113 shown in FIG. 13 undergo an undesirable posture change, that is, a twist. This would result in operational failure or breakage of the rolling elements 113. Thus, in conventional technique, the linear guide mechanism with the built-in rolling elements shown in FIG. 13 cannot be adopted, or even if it is adopted, its service life will be short.

However, since there is a demand to reduce facility cost and operation cost, an improved structure of the mold clamping apparatus is needed for adopting the linear guide mechanism with the built-in rolling elements.

SUMMARY OF THE INVENTION

It is therefore an object of the present invention to provide a mold clamping apparatus capable of adopting a linear guide mechanism with built-in rolling elements.

According to one aspect of the present invention, there is provided a mold clamping apparatus comprising: a base; a fixed platen fixedly mounted on the base and supporting a fixed mold; a mold clamping cylinder disposed parallel to the fixed platen and horizontally movably supported on the base, the mold clamping cylinder having a piston rod extending toward the fixed mold; a movable platen disposed between the fixed platen and the mold clamping cylinder and connected to the piston rod in such a manner as to be horizontally movably supported, the movable platen supporting a movable mold; tie bars extending horizontally from the fixed platen and penetrating the movable platen and the mold clamping cylinder; a connecting mechanism arbitrarily connecting the mold clamping cylinder or the fixed platen to the tie bars; and a mold opening/closing actuator for moving the mold clamping cylinder or the movable platen, wherein the mold clamping cylinder is supported by the base via left and right linear guide mechanisms, each of the left and right linear guide mechanisms having a plurality of rolling elements built therein, wherein the left and right linear guide mechanisms include left and right rails laid on the base, and left and right sliders linearly slidably fitted with the left and right rails, respectively, via the rolling elements, wherein the tie bars include an upper tie bar and left and right lower tie bars disposed below the upper tie bar, and wherein the mold clamping cylinder includes, in a region thereof located below the left and right lower tie bars and above the left and right sliders, a left grooved portion opened leftward and elongated horizontally, a right grooved portion opened rightward and elongated horizontally, and a leg portion formed between the left and right grooved portions.

The mold clamping cylinder according to the present invention includes, in the region thereof below the lower tie bars and above the sliders, the left grooved portion opened leftward and elongated horizontally, the right grooved portion opened rightward and elongated horizontally, and the leg portion formed between the left and right grooved portions. Even when the mold clamping cylinder is deformed by a mold clamping reaction force, the deformation is intercepted by the left and right grooved portions, so that no or negligible angle variation of the sliders is caused. Thus, there is no concern that the linear guide mechanisms with the built-in rolling elements are damaged. That is, according to the present invention, the mold clamping apparatus adopting the linear guide mechanisms with the built-in rolling elements can be realized.

Preferably, a horizontally elongated plate member is fixedly joined to a lower end of the leg portion, and the left and right sliders are attached to the horizontally elongated plate member. With this arrangement, grinding margins for forming the left and right grooved portions can be reduced, and thereby the material yield of the mold clamping cylinder can be improved, which leads to reduction of the manufacturing cost of the mold clamping cylinder.

BRIEF DESCRIPTION OF THE DRAWINGS

Certain preferred embodiments of the present invention will be described in detail below, by way of example only, with reference to the accompanying drawings, in which:

FIG. 4 is a view taken in a direction of arrows 4-4 of FIG. 1;

FIG. 6 is a flowchart showing a mold thickness adjustment process;

FIG. 7 is a flowchart showing a mold clamping process and an injection molding process;

DETAILED DESCRIPTION OF THE PREFERRED EMBODIMENTS

Figure 1:
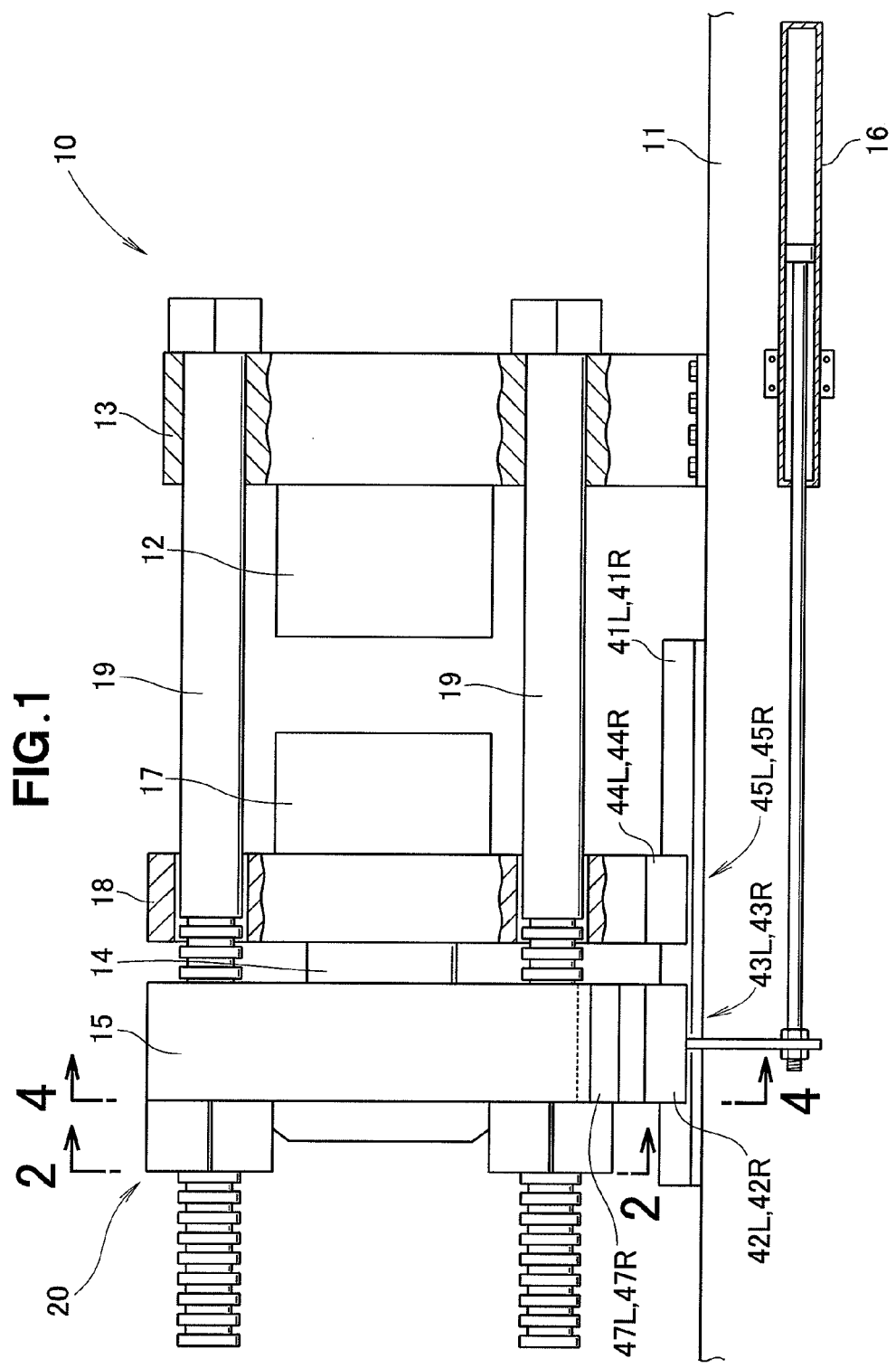
FIG. 1 is a side view of a mold clamping apparatus according to the present invention.

As shown in FIG. 1, a mold clamping apparatus 10 includes a base 11, a fixed platen 13 fixedly mounted on the base 11 and supporting a fixed mold 12, a mold clamping cylinder 15 disposed parallel to the fixed platen 13 and horizontally movably supported on the base 11, the mold clamping cylinder 15 having a piston rod 14 extending toward the fixed mold 12, a mold opening/closing actuator 16 for moving the mold clamping cylinder 15, a movable platen 18 disposed between the fixed platen 13 and the mold clamping cylinder 15 and connected to the piston rod 14 in such a manner as to be horizontally movably supported on the base 11, the movable platen 18 supporting a movable mold 17, tie bars 19, 19 extending horizontally from the fixed platen 13 and penetrating the movable platen 18 and the mold clamping cylinder 15, and a connecting mechanism 20 arbitrarily connecting the mold clamping cylinder 15 to the tie bars 19.

Any of a hydraulic cylinder and an electric cylinder may be used as the mold opening/closing actuator 16.

Figure 2:
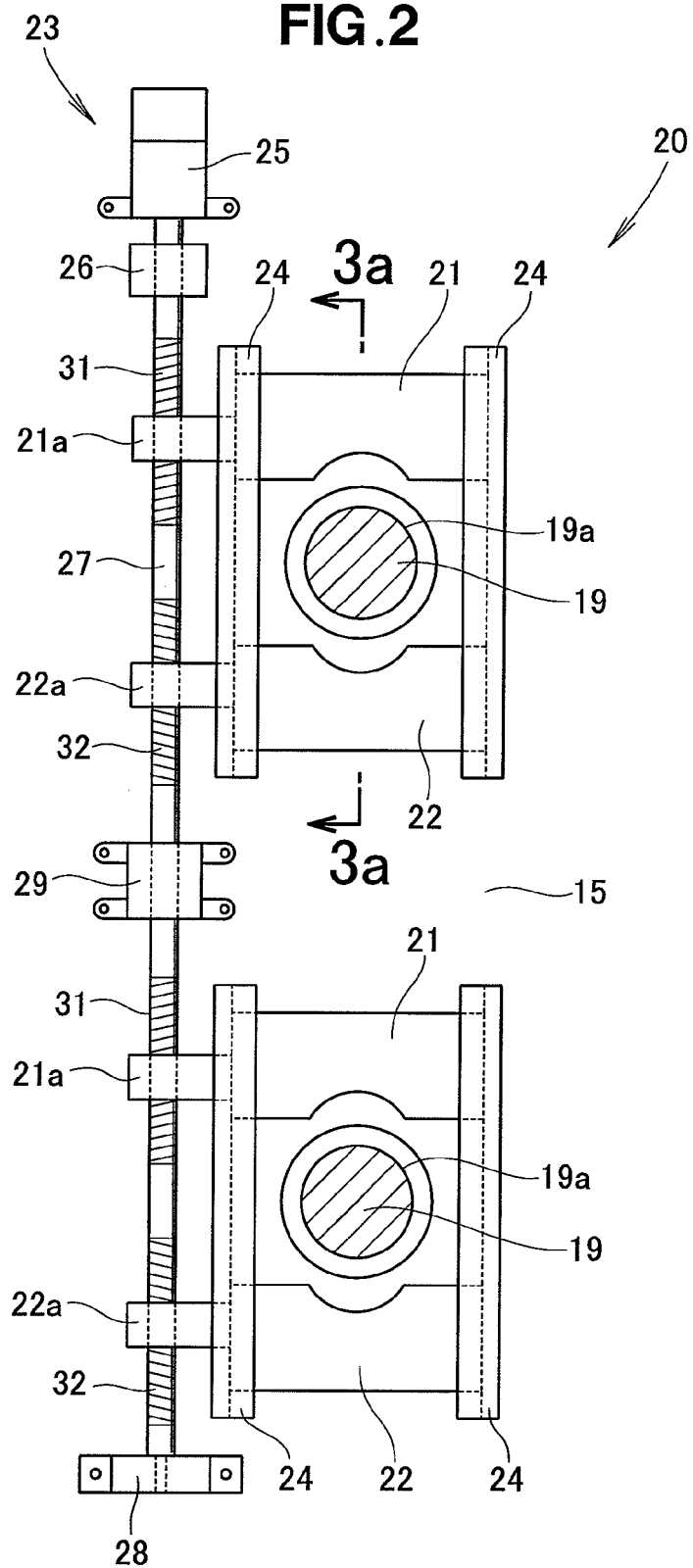
FIG. 2 is a view taken in a direction of arrows 2-2 of FIG. 1.

As shown in FIG. 2, the connecting mechanism 20 includes circumferential grooves 19a formed on each of the tie bars 19, lock plates 21, 22 formed to be fitted with a selected one of the circumferential grooves 19a, and a lock plate moving actuator 23 for moving the lock plates 21, 22 in a direction of front/back of the sheet (in a direction perpendicular to an axis of the tie bar 19). The lock plates 21, 22 are guided by guides 24, 24 each having an L-shaped cross section so as to prevent movement of the lock plates 21, 22 in an axial direction of the tie bar 19.

The lock plate moving actuator 23 consists of a servo motor 25, and a screw shaft 27 driven by the servo motor 25 via a coupling 26. A lower end and an intermediate portion of the screw shaft 27 are supported by bearing stands 28, 29, respectively. The screw shaft 27 has right screws 31 and left screws 32 formed thereon. A nut 21a extending from the upper lock plate 21 is threadedly engaged with the right screw 31, and a nut 22a extending from the lower lock plate 22 is threadedly engaged with the left screw 32. When the screw shaft 27 is rotated in a forward direction, the upper and lower lock plates 21, 22 are synchronously moved closer to the circumferential grooves 19a. When the screw shaft 27 is rotated in a reverse direction, the upper and lower lock plates 21, 22 are synchronously moved away from the circumferential grooves 19a.

Figure 3A:
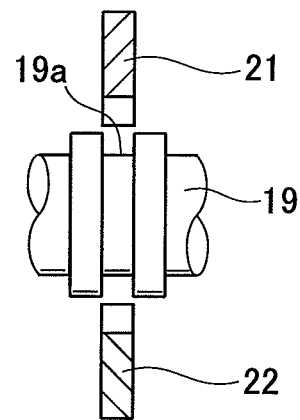
FIGS. 3A and 3B are cross-sectional views taken along line 3a-3a of FIG. 2, showing an operation of the mold clamping apparatus.
Figure 3B:
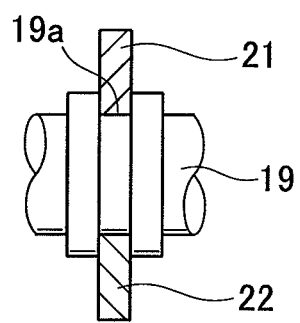

The upper and lower lock plates 21, 22 shown in FIG. 3A are moved closer to a selected one of the circumferential grooves 19a, and fitted with the selected one of the circumferential grooves 19a as shown in FIG. 3B. In this state, the mold clamping cylinder 15 shown in FIG. 1 is integrated with the tie bars 19. Conversely, in FIG. 3A, the mold clamping cylinder 15 shown in FIG. 1 is movable separately from the tie bars 19.

Figure 13:
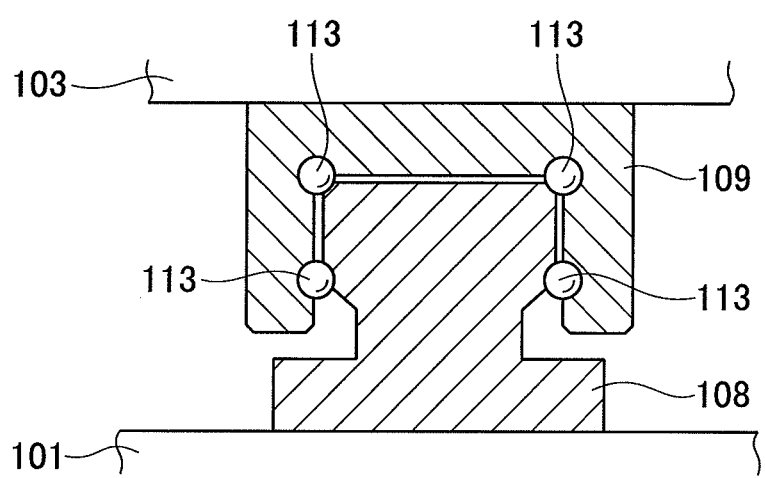
FIG. 13 is a cross-sectional view of a linear guide mechanism with built-in rolling elements.

As shown in FIG. 4, the mold clamping cylinder 15 is supported by the base 11 via left and right linear guide mechanisms 43L, 43R (suffixes "L" and "R" represent "left" and "right", respectively, and the same applies hereinbelow) with built-in rolling elements. The left and right linear guide mechanisms 43L, 43R with the built-in rolling elements include left and right rails 41L, 41R laid on the base 11, and left and right sliders 42L, 42R linearly slidably fitted with the left and right rails 41L, 41R, respectively, via the rolling elements (identical with the ones 113 shown in FIG. 13).

As shown in FIG. 1, the movable platen 18 is also supported by the base 11 via left and right linear guide mechanisms 45L, 45R with built-in rolling elements. The left and right linear guide mechanisms 45L, 45R with the built-in rolling elements include the left and right rails 41L, 41R, and left and right sliders 44L, 44R linearly slidably fitted with the left and right rails 41L, 41R, respectively, via the rolling elements (identical with the ones 113 shown in FIG. 13).

Note that the movable platen 18 may be guided by left and right rails provided separately from the left and right rails 41L, 41R on the base 11. Further, the left and right sliders 42L, 42R may have extension portions which are extended by a certain length toward the fixed platen 13 and provided with rails laid thereon, and the left and right sliders 44L, 44R may be fitted with these rails. That is, the movable platen 18 may be movably supported directly by the base 11 via the left and right rails 41L, 41R, or may be movably supported indirectly by the base 11 via the extension portions and the additional rails. In other words, a structure for movably supporting the movable platen 18 can be arbitrary, as long as the movable platen 18 is disposed between the fixed platen 13 and the mold clamping cylinder 15, connected to the piston rod 14 in such a manner as to be horizontally movably supported, and supporting the movable mold 17.

As shown in FIG. 4, the left and right upper tie bars 19, 19 and the left and right lower tie bars 19,19 penetrate through the mold clamping cylinder 15 which is supported by the base 11 via the left and right linear guide mechanisms 43L, 43R with the built-in rolling elements. Note that the tie bars 19 may consist of a single upper tie bar and two lower tie bars.

The mold clamping cylinder 15 includes, in a region thereof located below the left and right lower tie bars 19,19 and above the left and right sliders 42L, 42R, a left grooved portion 47L opened leftward and elongated horizontally, a right grooved portion 47R opened rightward and elongated horizontally, and a leg portion 48 formed between the left and right grooved portions 47L, 47R. The left and right grooved portions 47L, 47R and the leg portion 48 together form a constricted part 49.

Further, the mold clamping cylinder 15 is provided with mold thickness adjustment cylinders 50, 50 arranged at an intermediate position between the upper tie bars 19, 19 and an intermediate position between the lower tie bars 19, 19 and extending in a depth direction of the sheet, i.e. toward the movable platen 18.

Figure 5:
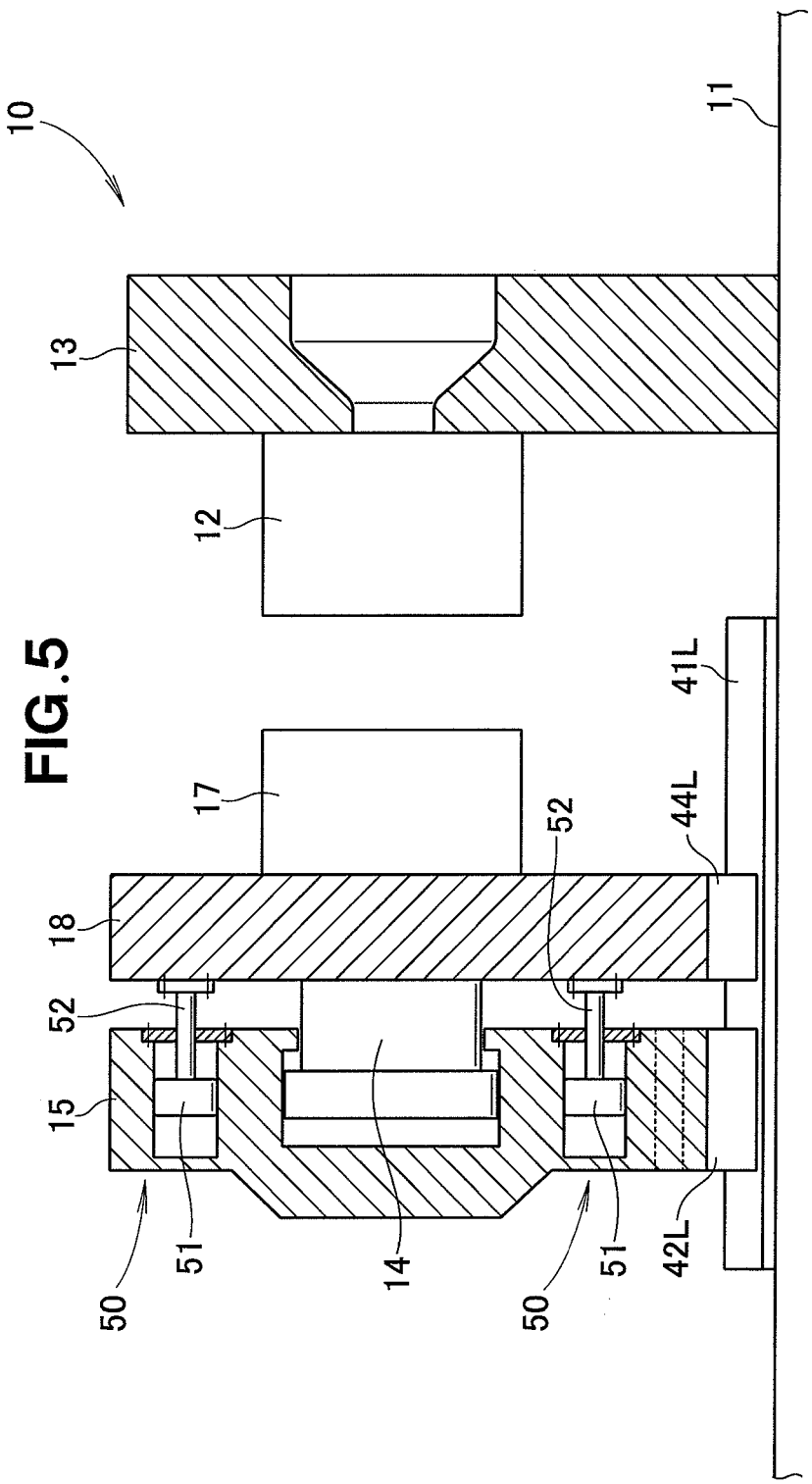
FIG. 5 is a cross-sectional view taken along line 5-5 of FIG. 4.

As shown in FIG. 5, the mold thickness adjustment cylinders 50 each include a piston 51 horizontally movably received within the mold clamping cylinder 15, and a piston rod 52 extending horizontally from the piston 51 and connected to the movable platen 18.

When the fixed mold 12 and the movable mold 17 are replaced, a mold closing position between the fixed mold 12 and the movable mold 17 is changed, and the lock plates 21, 22 of the connecting mechanism 20 are no longer fitted with the previously mated circumferential grooves 19a of the tie bars 19. Therefore, positional adjustment is performed by operating the mold opening/closing actuator 16 to close the fixed mold 12 and the movable mold 17, and then expanding and contracting the mold thickness adjustment cylinders 50 to move the mold clamping cylinder 15 with respect to the movable platen 18. The lock plates 21, 22 of the connecting mechanism 20 are thereby fitted with the circumferential grooves 19a of the tie bars 19. Thus, the mold thickness adjustment cylinders 50 are used for positional adjustment according to the thicknesses of the fixed mold 12 and the movable mold 17 so that the lock plates 21, 22 of the connecting mechanism 20 are fitted with the circumferential grooves 19a of the tie bars 19.

Below will be described an operation of the mold clamping apparatus 10 having the above-described configuration. As shown in FIG. 6, first, the molds are replaced (ST01). More specifically, referring also to FIG. 1, the fixed mold 12 and the movable mold 17 are replaced by desired ones.

Next, the connecting mechanism 20 is set in an unlocked state (ST02). The connecting mechanism 20 shown in FIG. 1 is unlocked to allow the mold clamping cylinder 15 to move. The mold opening/closing actuator 16 is then operated in a contracting direction (ST03). The movable platen 18 shown in FIG. 1 is moved together with the mold clamping cylinder 15 toward the fixed platen 13, whereby the movable mold 17 is abutted on the fixed mold 12. In other words, the molds are made touch.

Next, according to the changed thicknesses of the molds, a distance between the mold clamping cylinder 15 and the movable platen 18 is adjusted by the mold thickness adjustment cylinders 50, 50 (ST04). The mold thickness adjustment cylinders 50, 50 are then slightly expanded and contracted as needed (ST05). More specifically, the mold thickness adjustment cylinders 50, 50 shown in FIG. 5 are slightly expanded and contracted so that the lock plates 21, 22 are fitted with the circumferential grooves 19a shown in FIG. 3A. In this step, the mold clamping cylinder 15 is slightly moved with respect to the movable platen 18 that is stopped. In this manner, the lock plates 21, 22 are fitted with the circumferential grooves 19a shown in FIG. 3A. Note that ST05 may be included in ST04 and performed simultaneously.

In the state of fitting, the connecting mechanism 20 is set in a locked state (ST06). The mold thickness adjustment is thereby completed.

Next will be described processes of mold clamping and injection molding with reference to FIG. 7. As shown in FIG. 7, the connecting mechanism 20 is set in the unlocked state (ST11), the mold opening/closing actuator 16 is operated in the contracting direction (ST12), and the molds are made touch. More specifically, referring also to FIG. 1, the connecting mechanism 20 is unlocked to allow the mold clamping cylinder 15 to move, and the mold opening/closing actuator 16 is operated in the contracting direction. The movable platen 18 is thereby moved together with the mold clamping cylinder 15 toward the fixed platen 13, and the movable mold 17 is abutted on the fixed mold 12.

The connecting mechanism 20 is set in the locked state (ST13). The mold clamping cylinder 15 is thereby integrated with the tie bars 19. In this state, the mold clamping cylinder 15 is expanded (ST14). Mold clamping process is thereby completed. A molten resin is injected in the molds and the injected resin is cooled.

Next, pressure of the mold clamping cylinder 15 is released (ST15). Pressure oil supplied to the mold clamping cylinder 15 shown in FIG. 5 is discharged. The piston rod 14 is thereby allowed to move. In ST16 shown in FIG. 7, it is determined whether a command for mold opening with boosted force, i.e. boosting mold opening command, is given or not. When the boosting mold opening command is given, the step advances to ST17 and the mold thickness adjustment cylinders 50 are contracted (ST17). In FIG. 5, when the mold thickness adjustment cylinders 50 are contracted the movable platen 18 and the movable mold 17 are pulled by a large force, whereby an initial stage of the mold opening process is performed. Note that the boosted force is set within a range of 2 to 4 times an axial force of the mold opening/closing actuator 16, and does not have to be simply 2 or 4 times.

The boosting mold opening is useful when a molded resin product is large in size and a large mold opening force is required. When an ordinary mold opening force is insufficient, mold opening cannot be sufficiently performed or it takes a longer time. By the boosting mold opening, quick and reliable mold opening can be performed. However, a stroke of the mold thickness adjustment cylinders 50 is short, and not long enough to perform a predetermined mold opening.

Thus, the connecting mechanism 20 is set in the unlocked state (ST18), and the mold opening/closing actuator 16 is operated in an expanding direction (ST19). In FIG. 1, by operating the mold opening/closing actuator 16 in the expanding direction, the movable mold 17 can be fully separated from the fixed mold 12. After the mold opening is completed, the product is taken out (ST20). By the series of steps described above, the injection molding process is completed. In ST21, if the injection molding process is to be continued, the step returns to ST 12. If the injection molding process is to be finished, the flow of operations is finished.

In ST16, when the boosting mold opening command is not given (NO), the step skips to ST18 without carrying out ST17.

Figure 8A:
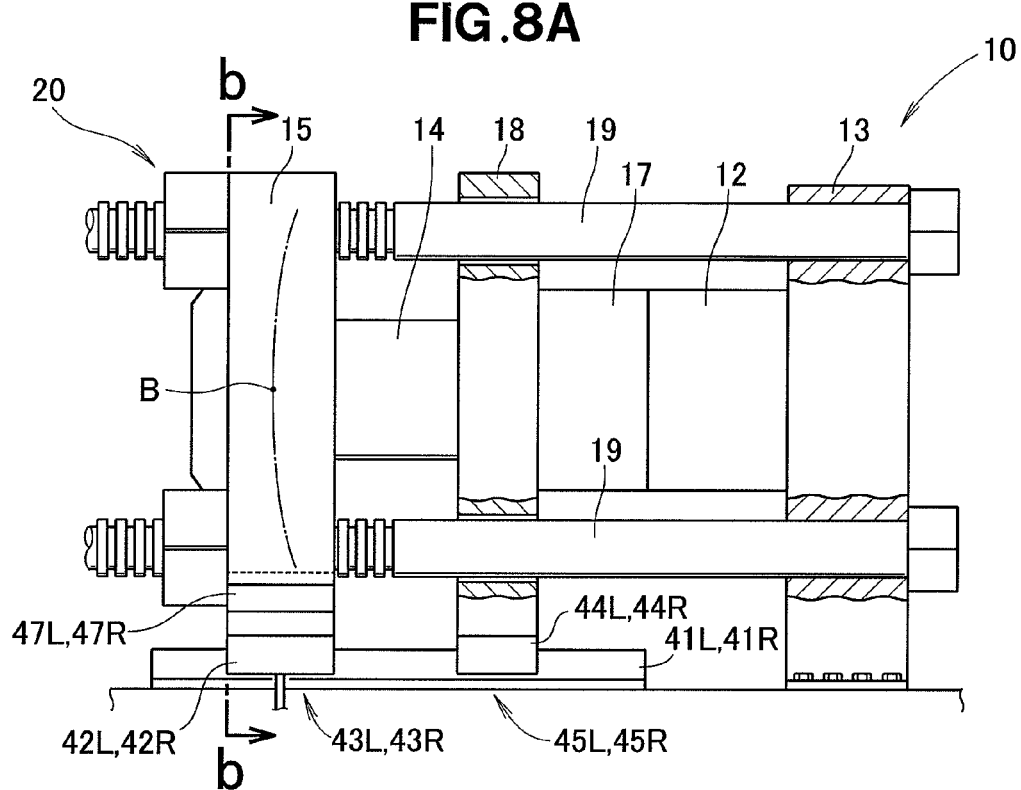
FIGS. 8A and 8B are views showing an operation of left and right grooved portions formed in a mold clamping cylinder.
Figure 8B:
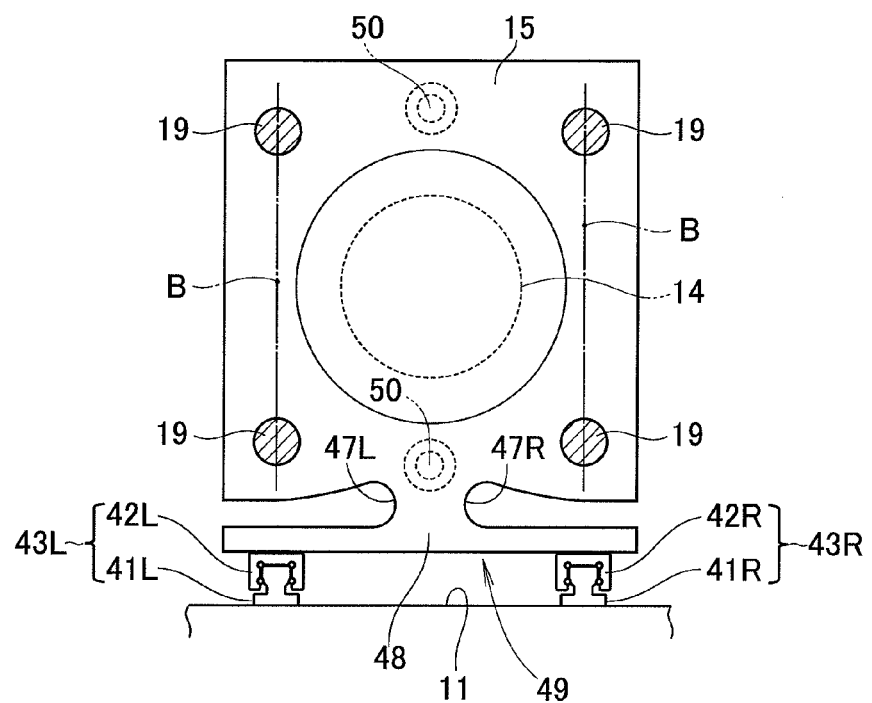

An operation of the embodiment particularly in ST14 (where the mold clamping cylinder 15 is expanded) among the above steps will be detailed below. As shown in FIG. 8A, after the movable mold 17 is abutted on the fixed mold 12, the mold clamping cylinder 15 is expanded, whereby a mold clamping reaction force is produced. By the mold clamping reaction force, the mold clamping cylinder 15 undergoes bending deformation as shown by an imaginary line B. Since the mold clamping cylinder 15 is prevented from moving by the upper tie bars 19 and the lower tie bars 19, as shown in FIG. 8B which is a view taken in a direction of arrows b-b of FIG. 8A, two imaginary lines B are presented passing vertically through the upper tie bars 19 and the lower tie bars 19.

The bending deformation shown by the imaginary lines B is intercepted by the left grooved portion 47L and the right grooved portion 47R, and is not transmitted to the left and right sliders 42L, 42R. If it is transmitted, the deformation is attenuated via the leg portion 48 which is formed between the grooved portions and is fragile compared to the other parts. As a result, it is possible to adopt the linear guide mechanisms 43L, 43R with the built-in rolling elements, which is easy to twist.

Figure 9:
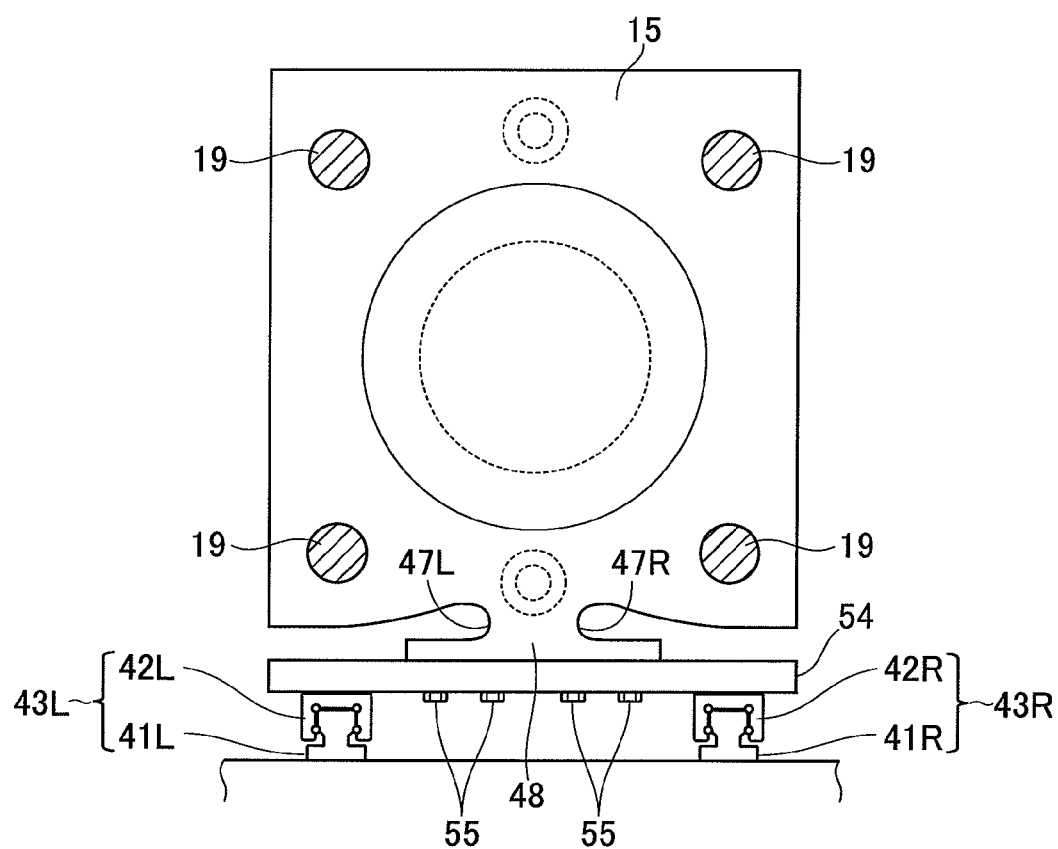
FIG. 9 is a view showing a modified mold clamping cylinder.

Below will be described a modified embodiment of the present invention. As shown in FIG. 9, the mold clamping cylinder 15 may be provided with a horizontally elongated plate member 54 at a lower end portion thereof. More specifically, the horizontally elongated plate member 54 is fixedly joined to a lower end of the leg portion 48 via bolts 55, and the left and right sliders 42L, 42R are attached to the plate member 54.

The mold clamping cylinder 15 shown in FIG. 4 has a large steel block body, and the left and right grooved portions 47L, 47R formed at a lower part of the steel block body. When the left and right grooved portions 47L, 47R are formed by grinding, the material yield is low. When the steel block body is formed by casting, the shape of a mold for casting is complicated. In this regard, with the configuration shown in FIG. 9, the material yield can be improved when formed by grinding with a small grinding allowance, and the shape of the mold can be simple when formed by casting.

Figure 10:
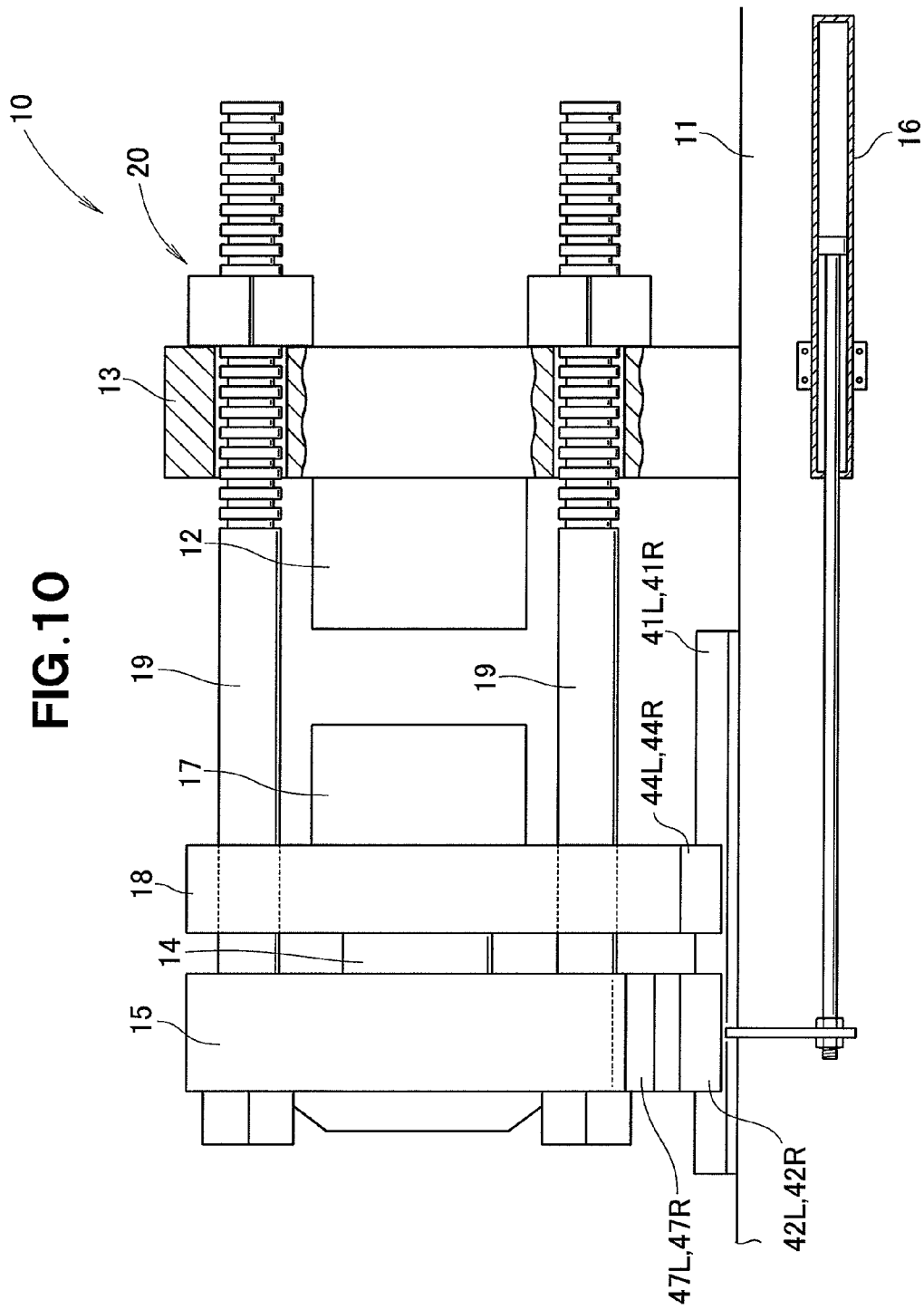
FIG. 10 is a view showing a mold clamping apparatus of a modified embodiment.
Figure 11:
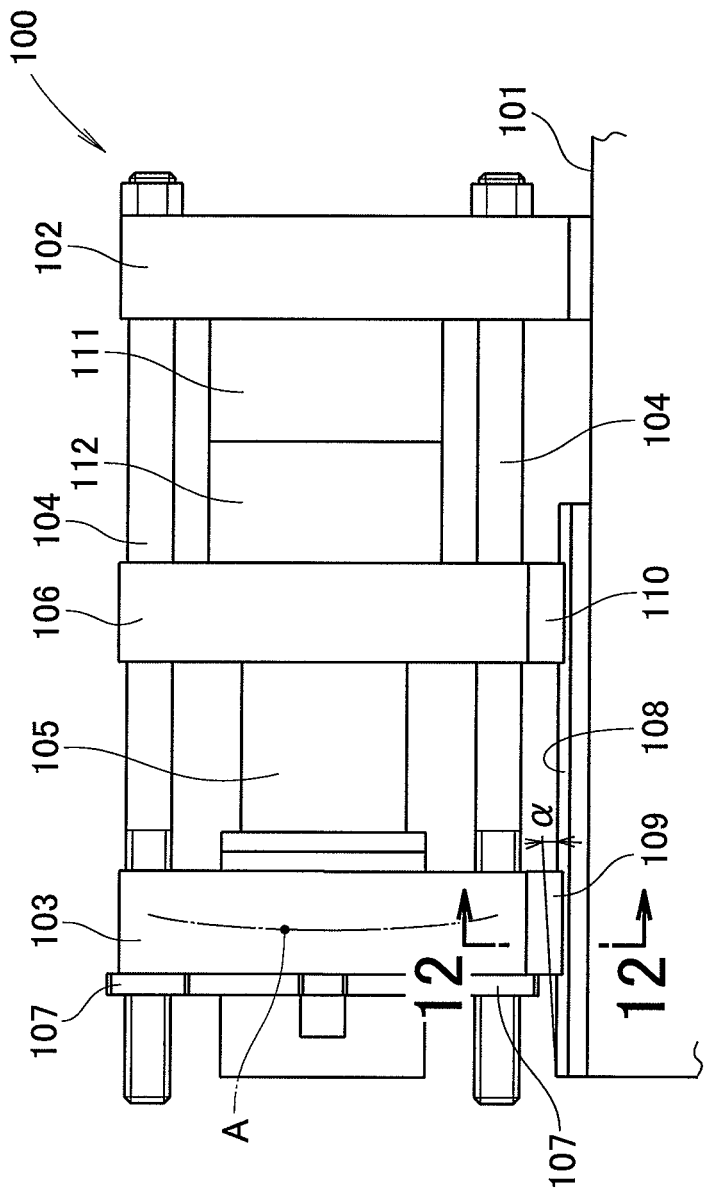
FIG. 11 is a side view of a conventional mold clamping apparatus.
Figure 12:
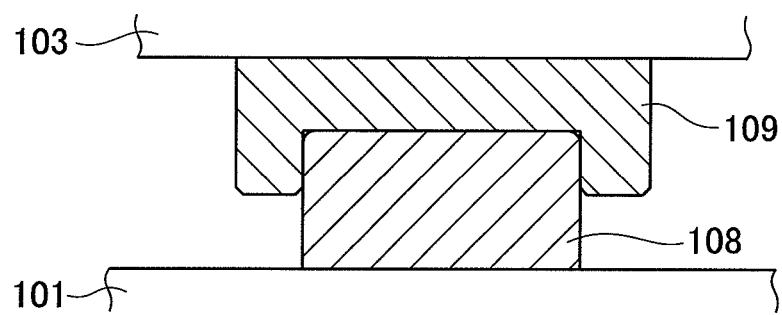
FIG. 12 is a cross-sectional view taken along line 12-12 of FIG. 11.

As shown in FIG. 10, the connecting mechanism 20 may be arranged on the fixed platen 13. In this configuration, the tie bars 19, 19 are moved horizontally together with the mold clamping cylinder 15. The rest of the configuration is identical to that shown in FIG. 1, and a detailed description is therefore omitted.

Further, although the mold opening/closing actuator 16 is mechanically connected to the mold clamping cylinder 15 as shown in FIGS. 10 and 1, the mold opening/closing actuator 16 may be connected to the movable platen 18. It is because the movable platen 18 and the mold clamping cylinder 15 are mechanically connected with each other via the mold thickness adjustment cylinders 50.

Obviously, various minor changes and modifications of the present invention are possible in light of the above teaching. It is therefore to be understood that within the scope of the appended claims the invention may be practiced otherwise than as specifically described.

What is claimed is:

1. A mold clamping apparatus comprising:
    a base;
    a fixed platen fixedly mounted on the base and supporting a fixed mold;
    a mold clamping cylinder disposed parallel to the fixed platen and horizontally movably supported on the base, the mold clamping cylinder having a piston rod extending toward the fixed mold;
    a movable platen disposed between the fixed platen and the mold clamping cylinder and connected to the piston rod in such a manner as to be horizontally movably supported, the movable platen supporting a movable mold;
    tie bars extending horizontally from the fixed platen and penetrating the movable platen and the mold clamping cylinder;
    a connecting mechanism arbitrarily connecting the mold clamping cylinder or the fixed platen to the tie bars; and
    a mold opening/closing actuator for moving the mold clamping cylinder or the movable platen,
    wherein the mold clamping cylinder is supported by the base via left and right linear guide mechanisms, each of the left and right linear guide mechanisms having a plurality of rolling elements built therein,
    wherein the left and right linear guide mechanisms include left and right rails laid on the base, and left and right sliders linearly slidably fitted with the left and right rails, respectively, via the rolling elements,
    wherein the tie bars include an upper tie bar and left and right lower tie bars disposed below the upper tie bar, and
    wherein the mold clamping cylinder includes, in a region thereof located below the left and right lower tie bars and above the left and right sliders, a left grooved portion opened leftward and elongated horizontally, a right grooved portion opened rightward and elongated horizontally, and a leg portion formed between the left and right grooved portions.

2. The mold clamping apparatus according to claim 1, further comprising a horizontally elongated plate member fixedly joined to a lower end of the leg portion, wherein the left and right sliders are attached to the horizontally elongated plate member.

* * * * *